(12) United States Patent
Mazzawi et al.

(10) Patent No.: US 10,546,086 B2
(45) Date of Patent: Jan. 28, 2020

(54) HARD ERROR SIMULATION AND USAGE THEREOF

(71) Applicant: OPTIMA DESIGN AUTOMATION LTD., Nazareth (IL)

(72) Inventors: Jamil R. Mazzawi, Nazareth (IL); Ayman K. Mouallem, Mi'ilya (IL); Manar H. Shehade, Haifa (IL)

(73) Assignee: OPTIMA DESIGN AUTOMATION LTD., Nazareth (IL)

( * ) Notice: Subject to any disclaimer, the term of this patent is extended or adjusted under 35 U.S.C. 154(b) by 6 days.

(21) Appl. No.: 15/951,869

(22) Filed: Apr. 12, 2018

(65) Prior Publication Data

US 2018/0232477 A1    Aug. 16, 2018

Related U.S. Application Data

(63) Continuation-in-part of application No. 14/624,603, filed on Feb. 18, 2015, now Pat. No. 10,025,895, and a continuation of application No. 14/601,312, filed on Jan. 21, 2015, now Pat. No. 9,430,599, application No. 15/951,869, filed on Apr. 12, 2018, which is a continuation-in-part of application No. 15/045,448, filed on Feb. 17, 2016, and a continuation-in-part of application No. 14/601,312, filed on Jan. 21, 2015, now Pat. No. 9,430,599.

(60) Provisional application No. 61/941,125, filed on Feb. 18, 2014, provisional application No. 62/106,305, filed on Jan. 22, 2015.

(51) Int. Cl.
G06F 17/50    (2006.01)

(52) U.S. Cl.
CPC ...... *G06F 17/5045* (2013.01); *G06F 17/5022* (2013.01); *G06F 17/5031* (2013.01); *G06F 2217/84* (2013.01)

(58) Field of Classification Search
CPC ............. G06F 17/5045; G06F 17/5022; G06F 17/5068; G06F 17/5031; G06F 2217/84
USPC ........ 716/106–107, 136, 100, 108, 110–113, 716/132, 134
See application file for complete search history.

(56) References Cited

U.S. PATENT DOCUMENTS

| | | | |
|---|---|---|---|
| 2009/0177936 A1* | 7/2009 | Koenemann | G01R 31/31703 714/737 |
| 2013/0007549 A1* | 1/2013 | Chan | G06F 11/261 714/741 |

* cited by examiner

*Primary Examiner* — Stacy Whitmore
(74) *Attorney, Agent, or Firm* — Myers Wolin, LLC (57) ABSTRACT

A method, apparatus and product for hard error simulation and usage thereof. The method comprises obtaining a design of a circuit, which comprises one or more monitoring signals for identifying errors and one or more critical nodes; obtaining a trace of a run of a test of the circuit; and obtaining a hard error fault on a node. The method comprises determining a hard-error test coverage for the hard error fault, wherein the hard-error test coverage is indicative of whether or not the one or more monitoring signals identifies the hard error fault during an execution of the test, and wherein said determining comprises: simulating the execution of the circuit together with the hard error fault and noting whether or not any one or more of the one or more monitoring signals has detected the hard error fault. An indication of the hard-error test coverage may be outputted.

18 Claims, 5 Drawing Sheets

HARD ERROR SIMULATION AND USAGE THEREOF

CROSS-REFERENCE TO RELATED APPLICATION

This application is a continuation in part of U.S. Non-Provisional application Ser. No. 14/624,603, entitled "CIRCUIT SIMULATION USING A RECORDING OF A s REFERENCE EXECUTION", filed Feb. 18, 2015, which is a continuation of U.S. Non-Provisional application Ser. No. 14/601,312 entitled "DETERMINING SOFT ERROR INFLICTION PROBABILITY" filed Jan. 21, 2015, now U.S. Pat. No. 9,430,599, and which is a non-provisional and claims the benefit of U.S. Provisional Patent Application No. 61/941,125, entitled "ERROR INJECTION ENGINE", filed Feb. 18, 2014; this application is further a continuation in part of U.S. Non-Provisional application Ser. No. 15/045,448, entitled "DETERMINING TRANSIENT ERROR FUNCTIONAL MASKING AND PROPAGATION PROBABILITIES", filed Feb. 17, 2016, which is a non-provisional of U.S. Provisional Patent Application No. 62/106,305, entitled "DETERMINING TRANSIENT ERROR FUNCTIONAL MASKING AND PROPAGATION PROBABILITIES", filed Jan. 1, 2015, and is a continuation in part of aforementioned U.S. Non-Provisional application Ser. No. 14/601,312, all of which are hereby incorporated by reference in their entirety without giving rise to disavowment.

TECHNICAL FIELD

The present disclosure relates to microelectronic design in general, and to simulation of a design, in particular.

BACKGROUND

Design simulation is a useful technique which allows engineers to determine the functionality of circuit designs. The simulation may be performed prior to the fabrication of a physical circuit (i.e., in the pre-silicon stage) and may allow for easy tracking of the circuit functionality as the value of each wire in the design at every cycle.

In some cases, fabricated designs may encounter a hard error. A hard error is a defect that occurs at some point in time to a particular product fabricated from said design, a defect that modifies the functionality of the design. A hard error may occur as a result of a fabrication problem, or it may happen a long time after fabrication, when the product is already in use. In some cases, hard errors may be permanent errors that are not rectified even when the design is rebooted.

BRIEF SUMMARY

One exemplary embodiment of the disclosed subject matter is a computer-implemented method comprising: obtaining a design of a circuit, wherein the circuit comprises nodes which are assigned values during execution, wherein the circuit comprises one or more monitoring signals for identifying errors and one or more critical nodes; obtaining a trace of a run of a test of the circuit; obtaining a hard error fault on a node, wherein the hard error fault is potentially capable of causing a wrong value to reach the one or more critical nodes; determining, by a processor, a hard-error test coverage for the hard error fault, wherein the hard-error test coverage is indicative of whether or not the one or more monitoring signals identifies the hard error fault during an execution of the test, and wherein said determining comprises: simulating the execution of the circuit together with the hard error fault and noting whether or not any one or more of the one or more monitoring signals has detected the hard error fault and outputting an indication of the hard-error test coverage.

Another exemplary embodiment of the disclosed subject matter is a computer program product comprising a computer readable storage medium retaining program instructions, which program instructions when read by a processor, cause the processor to perform: obtaining a design of a circuit, wherein the circuit comprises nodes which are assigned values during execution, wherein the circuit comprises one or more monitoring signals for identifying errors and one or more critical nodes; obtaining a trace of a run of a test of the circuit; obtaining a hard error fault on a node, wherein the hard error fault is potentially capable of causing a wrong value to reach the one or more critical nodes; determining, by a processor, a hard-error test coverage for the hard error fault, wherein the hard-error test coverage is indicative of whether or not the one or more monitoring signals identifies the hard error fault during an execution of the test, and wherein said determining comprises: simulating the execution of the circuit together with the hard error fault and noting whether or not any one or more of the one or more monitoring signals has detected the hard error fault and outputting an indication of the hard-error test coverage.

Yet another exemplary embodiment of the disclosed subject matter is a computerized device comprising a processor and a memory retaining a computer program product in accordance with the disclosed subject matter, or that is otherwise configured to perform the steps of a method in accordance with the disclosed subject matter.

Optionally, said determining is performed with respect to a plurality of nodes comprised in the circuit, whereby test coverage is determined for each node of the plurality of nodes, wherein said outputting comprises outputting a list of the plurality of the nodes and associated coverage values of the hard error fault on the plurality of nodes.

Optionally, said outputting comprises outputting an aggregate coverage value, wherein the aggregate coverage value is a ratio of executions in which the hard error faults were detected out of all possible executions.

Optionally, said simulating execution comprises: determining a modified design simulating the hard error fault, wherein the modified design is configured to set a value of the node to a constant value in each cycle.

Optionally, said simulating execution comprises: determining a modified design simulating the hard error fault, wherein the modified design is configured to set a value of the node to a random value in each cycle that is not influenced by input signals to the node.

Optionally, said simulating execution comprises: determining a modified design simulating the hard error fault, wherein the modified design is configured to set a value of the node to an X value in each cycle, representing an unknown value.

Optionally, said simulating execution comprises: determining a modified design simulating the hard error fault, wherein the design comprises a modeling of a first function defining a value of the signal in each cycle, wherein the modified design comprises a modeling of a second function defining a value of the signal in each cycle, wherein the second function is different than the first function.

Optionally, at least one of the one or more monitoring signals is part of a Built-In Self Test (BIST) or part of a lock-step or Triple Modular Redundancy (TMR) construct.

Optionally, the method further comprising: obtaining a recording of a reference execution of the circuit, wherein the recording comprises recorded values of the nodes in a plurality of cycles; and wherein said simulating the execution of the circuit is performed using the recorded values of the reference execution.

Optionally, the method further comprising: identifying one or more interesting nodes, wherein a Logic of Influence (LOI) of each of the one or more interesting nodes comprises at least one monitoring signal and at least one critical node; wherein said simulating comprises, during simulation of each cycle: determining a sub-set of the interesting nodes the value of which is potentially different than the recorded value in a corresponding cycle in the reference execution; for each node not in the sub-set of nodes, using the recorded value as the value of the node; and for each node in the sub-set of nodes, computing the value of the node.

Optionally, said determining comprises; for each interesting node, determining whether values of an influencing set of nodes of the interesting node are the same in the simulation as in the reference execution, wherein the influence set of nodes is a set of nodes in the design that define the value of the node.

Optionally, the influencing set of nodes of the interesting node in a first cycle is different than the influencing set of nodes of the interesting node in a second cycle, whereby a determination of whether to compute a value of the interesting node is made based on a different set of nodes in different cycles.

Optionally, said simulating comprises, during simulation of each cycle, avoiding computation of values in one or more undetectable nodes, wherein a Logic of Influence (LOI) of each of the one or more undetectable nodes does not comprise any of the one or more monitoring signals.

Optionally, the method further comprising: determining that the reference execution is missing the recorded values of one or more non-input signals in one or more cycles; and in response to said determining that the reference execution is missing the recorded values, reconstructing the missing values using a simulation without any faults.

Optionally, the method further comprising verifying the node with the hard error fault is an interesting node, wherein said verifying comprises determining a Logic of Influence (LOI) of the node, and verifying that the LOI comprises at least one monitoring signal and at least one critical node, wherein said method further comprising marking all nodes without any critical node in their respective LOI as safe nodes; and marking all nodes having at least one critical node in their respective LOI and not having any monitoring signals in their respective LOI as undetectable for all tests.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

In the present disclosure the term "signal", also referred to as "node", refers to an element of a circuit design which receives a value. The signal may be any wire in the design, such as but not limited to, input, output, output of a memory element, input of a memory element, output of a gate, or the like.

In the present disclosure the term "memory element" or "flop" refers to any element of a circuit which retains data over different cycles, including but not limited to a flip flop, a register, a latch, a counter, a digital element having the capability to retain its value, or the like.

One technical problem dealt with by the disclosed subject matter is to determine a design's susceptibility to hard errors.

Another technical problem is to provide for an efficient fault simulation process which simulates functionality of a design under hard error. It will be noted that a design is any representation of a circuit, such as for example, in RTL, Gate Level, combination thereof, or the like. Preferably, fault simulation that is desired is much faster than merely naively simulating independently each fault.

One technical solution is to compute hard-error test coverage. In some exemplary embodiments, hard-error test coverage may be computed for a given design and a given test. This metric may be used to determine the design's susceptibility to hard errors given that test. In some exemplary embodiments, error detection and correction functionalities of the design may be analyzed to determine whether they provide sufficient protection against hard errors that may occur in the design.

Hard errors are often dealt with by periodically executing a test and comparing its results to the correct ones. If the test ever fails, the existence of a fault has been exposed (with adequate means of distinguishing hard or permanent faults from soft or transient ones, which are beyond the scope of this application). This method, however, critically depends on a proper assessment of the quality of said test, i.e., how many defects it can expose and how many will slip past the test unnoticed.

In some exemplary embodiments, a circuit may include one or more signals used for detecting or correcting errors, termed "monitoring signals". In some cases, a monitoring signal may be part of a Built-in Self Test (BIST) such as performed during boot or periodically. Additionally or alternatively, the monitoring signal may be part of a lock-step or Triple Modular Redundancy (TMR) construct. Additionally or alternatively, a monitoring signal may be used as part of a detection mechanism, such as Cyclic Redundancy Check (CRC), as part of a correction mechanism, such as Error Correction Code (ECC), or the like. In some exemplary embodiments, the monitoring signal may be configured to identify that an error occurred in the design when a value defined by an affected node propagates into the monitoring signal. In some exemplary embodiments, any fault that, for a given test, causes a fault to propagate to one or more monitoring signals would be considered a "detected" fault for that test.

In some exemplary embodiments, a circuit may include one or more nodes designated "critical". In some exemplary embodiments, critical nodes are nodes that if a fault reaches them, it is deemed by the system to be a safety hazard. Put differently, any fault that can be shown to be incapable of reaching any critical node may be deemed safe. In some exemplary embodiments, only nodes that pose safety risks, in that faults on them could potentially impact a critical node, are deemed "sensitive" and taken into account for the purpose of computing the test coverage. In some exemplary embodiments, only sensitive nodes that can be detected by one or more monitoring signals are deemed "interesting", while all other sensitive nodes are deemed "undetectable" and reported out as nodes that can cause safety violations but can never be detected.

In some exemplary embodiments, the aggregated test coverage may be computed by executing (using a simulation or otherwise) a fault simulation for every fault on every interesting signal (but not on un-interesting ones) and checking the ratio between the detected faults and all tested faults. Put differently, the aggregated test coverage for a given test may be computed as M/N, where M is the number of executions in which the error in the node was detected and N is the number of total possible executions. The number of total possible executions may be the total number of executions that would actually be performed once the process has ended. Additionally or alternatively, the number of total possible executions may be larger than the number of executions that would be performed, such as in case some executions were avoided due to some optimizations (e.g., avoiding execution simulations of faults occurring in undetectable or safe nodes). In some cases, the propagation to the monitoring signal may be required to reach it within a predetermined number of cycles. In some cases, different hard errors may be simulated. Additionally or alternatively, different initial states may be used in the simulation.

Another technical solution is to utilize a recording of a reference execution as a basis for a present simulation process. In some exemplary embodiments, a reference execution—e.g., a simulation—is performed and can provide valuable information. For example, after computing millions of cycles in which the values of all or subset of the nodes are recorded, the recording (e.g., a trace file) may be used to speed up new simulation instances. Each simulation instance may utilize the values from the recording, except in nodes which get a different value (e.g., the node affected by the error, and any node to which a modified value propagates). Simulation may be performed for the full execution of the test, for a predetermined number of cycles, or until reaching a halting condition such as the modified value propagating into a monitoring signal. By using the reference simulation, the value of most of the signals may be known and not require any additional computation, providing for a substantial speedup in the process by focusing on computing only the values which are affected by the difference between the current simulation process and the reference simulation.

In some exemplary embodiments, in order to simulate the hard error, a change in the netlist of the design may be introduced. The change in the netlist may be permanent (i.e., affecting each cycle after the change is introduced) or temporary (i.e., affecting one cycle or a plurality of cycles). The change may be introduced at any cycle, including the first cycle of the simulation or at a later cycle.

A change in the netlist can be a change of the modeling of the behavior of a certain signal. As an example, instead of the original netlist formula for signal A (A=B and C), a modified formula may be used (A'=B or C). As another example, the behavior may be that certain signals are fixed or stuck-at to constant 0 or constant 1 (for all cycles: C=0). As another example, the behavior may be modeled as a random behavior. As another example, the random behavior may be a constrained random behavior given a constraint that the user may control. As another example, the value of the signal may be determined for a set of cycles, such as based on a user specified pattern setting the value of the signal in the cycles (e.g., pattern "0001100" may indicate the value be set to "0" for 3 cycles, to "1" for two cycles, and to "0" to two cycles). As another example, specific modeling may be introduced. The specific modeling may be, for example, if the signal is rising at this cycle (n), we delay the rise to next cycle: if cy(n−1)==0 and cy(n)=1 then cy(n)=0 and cy(n+)=1. Another modeling may use X-propagation, where the symbol X is used to denote an unknown value that might be either 0 value or 1 value, and the value X is given at a certain node then propagated through the logic. Other examples may include other fault models such as circuit fault, open fault, bridging fault, delay fault, or the like. Additional faults models that can be used may be apparent to a person of ordinary skill in the art in view of the present disclosure.

Yet another technical solution may include avoiding simulating non-interesting or undetectable faults. Non-interesting faults may be faults which cannot potentially affect any critical nodes. If a fault cannot affect any critical node then that fault may be deemed as safe, and there is no benefit in simulating it. If a fault cannot be detected by any monitoring signal, it should be flagged as a safety risk, but again there is no benefit in simulating it. Such identification of safe and undetectable faults based on the LOI enables reduction of computation of values, saving time. As a substantial portion of the circuit may include nodes with non-interesting or undetectable faults, such a solution may drastically reduce the computation requirements in each cycle of a simulation of the design and may provide a significant speedup.

One technical effect of utilizing the disclosed subject matter is to provide a useful insight into the operation of the design and determining whether mechanisms in place are sufficient to provide a desired level of reliability. In some cases, by computing the test coverage for the given test, the designer may be informed of aspects of the design or the test that are less monitored for erroneous behavior.

Another technical effect of utilizing the disclosed subject matter is to provide a speedup of simulation that is based on reducing required computations. In some experimental results performed, the speedup was by a factor of 20,000 times faster than the traditional simulation of computing each node in each cycle.

Figure 1:
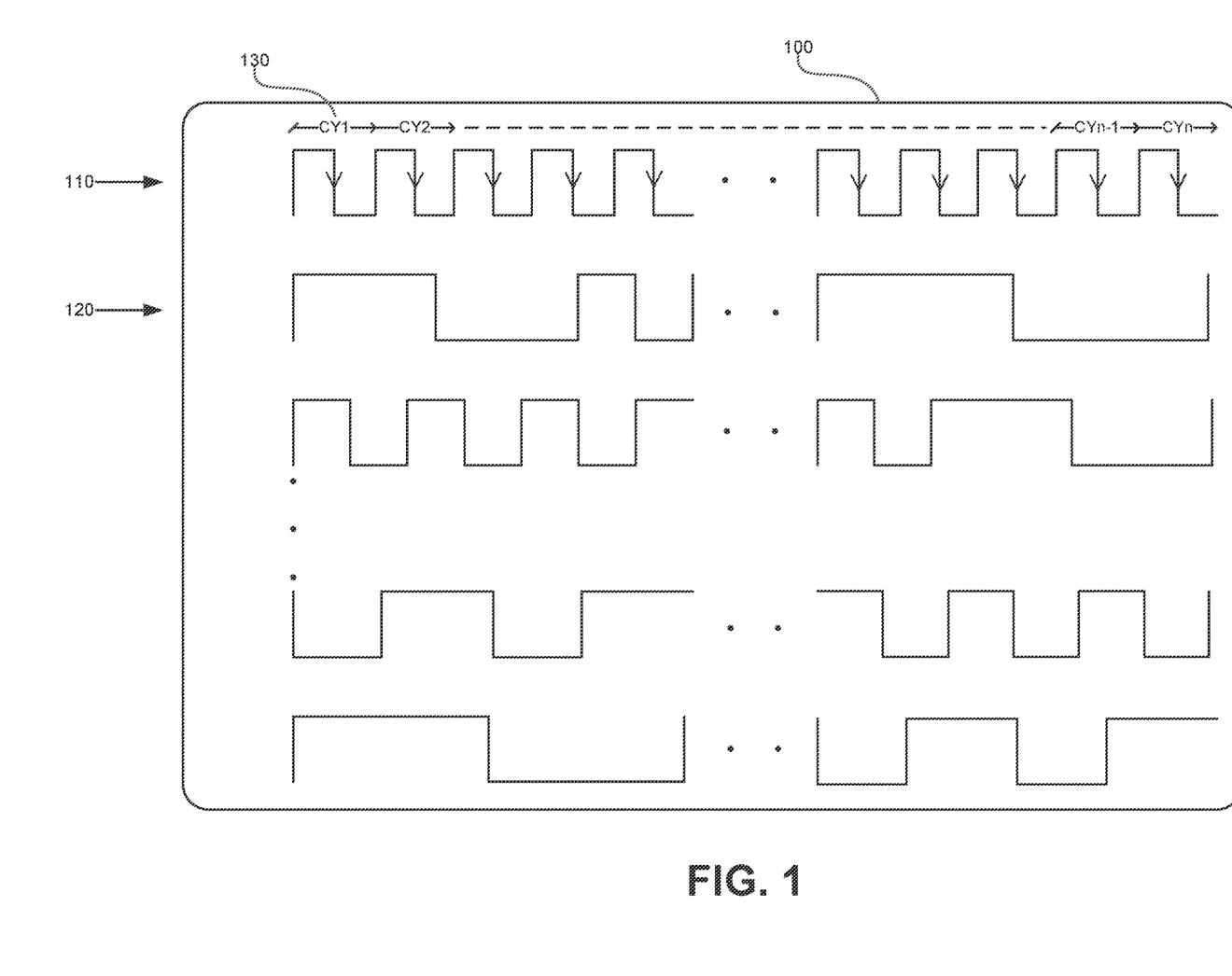
FIG. 1 shows an illustration of a trace, in accordance with some exemplary embodiments of the subject matter.

Referring now to FIG. 1 showing an illustration of a trace, in accordance with some exemplary embodiments of the subject matter:

A Trace 100 may be used to represent recorded values of signal in a circuit design, such as for example, a microprocessor, or the like. Trace 100 may be visualized as a series of snapshots of a state machine. Each snapshot reveals the behavior of nodes of the circuit at a given cycle of the execution. In some exemplary embodiments, Trace 100 may be a file comprising recorded binary values in an execution of the circuit. The values of the trace may be calculated throughout a software simulation process of the circuit.

Additionally or alternatively, the trace may be captured by a logic analyzer from an actual execution of the circuit or from any source.

In some exemplary embodiments, Trace 100 may comprise a Clock Signal 110. Clock Signal 110 may be used as a synchronizing clock to define cycles of the circuit. In some exemplary embodiments, Trace 100 may comprise a finite number of cycles, where each one of them may be sequentially numbered. In some exemplary embodiments, the length of a trace may be determined by the number of cycles. A trace may contain multiple clock signals, where each node in the circuit may be associated with a given/different clock-signal. Additionally or alternatively, only a portion of Trace 100 may be of interest, such as one or more portions thereof. In some exemplary embodiments, predetermined marking cycles may be set to indicate boundaries of a Region of Interest (ROI) within the trace. As an example, ROI may be a portion of the trace that is considered representative of a typical behavior of the design (also referred to as "typical trace").

In some exemplary embodiments, Trace 100 may show values of signals of the circuit over time, such as Curve 120. In some exemplary embodiments, Curve 120 may be a waveform indicating the state of a signal of the circuit. Curve 120 may indicate a value for each cycle, such as for example the value at $CY_1$ 130.

Additionally or alternatively, Curve 120 may be associated to an output of a flop and display the same value as the flop. In some exemplary embodiments, the value of the Curve 120 may be cycle dependent and may change from cycle to cycle. As an example, the value of Curve 120 may be "1" in cycles $CY_1$ 130 and in $CY_2$, while in $CY_{n-1}$ and $CY_n$, the value of Curve 120 is "0".

Additionally or alternatively, Trace 100 may be provided in a digital form representing the recorded values of each node in different cycles. In some exemplary embodiments, the trace may also include information relating to values of additional signals.

Figure 2:
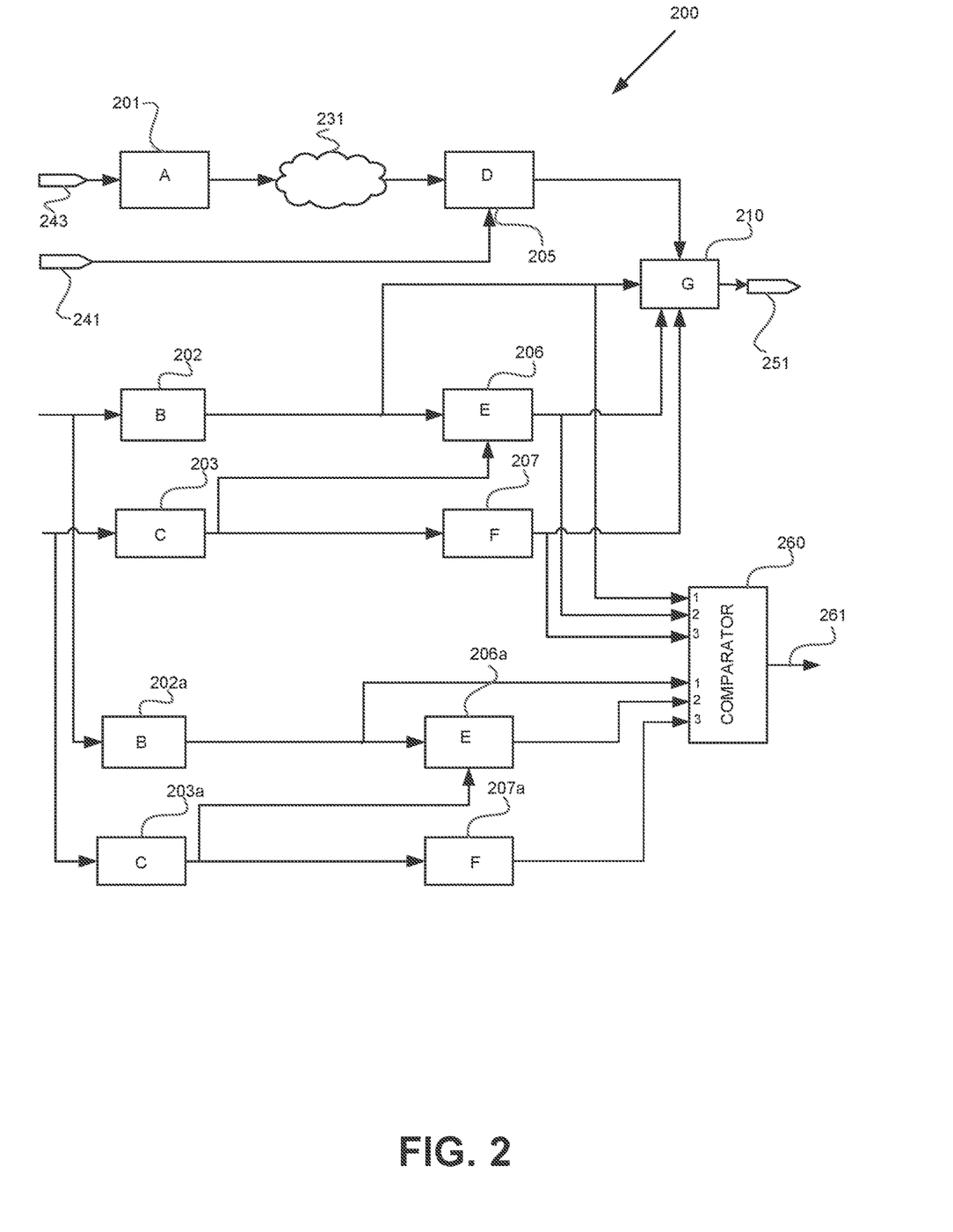
FIG. 2 shows an illustration of a circuit, in accordance with some exemplary embodiments of the subject matter.

Referring now to FIG. 2 showing an illustration of a circuit, in accordance with some exemplary embodiments of the subject matter.

A Circuit 200 may be a design representation of a circuit. The design depicted in Circuit 200 may comprise hardware elements and wires linking them to one another. In some exemplary embodiments, Circuit 200 may be obtained in the form of one or more electronic design files, for example, a Netlist file, Gate-Level, Register Transfer Level (RTL), Hardware Description Language (HDL) like Verilog, SystemVerilog or VHDL, a combination thereof, or the like.

In some exemplary embodiments, Circuit 200 may comprise flops, such as Flop 201. Flop 201 may be a memory element, such as for example, a flip-flop, a register, a latch, a counter, a digital element having the capability to retain its value or the like. Flop 201 may have an input, an output and a clock input (not shown). The output of the flop, also referred to as a state of the flop or node, may sample the value of its input on each cycle, clock edge, etc. (e.g. the clock being high or the clock rising). As a result, the flop retains its value until the next cycle, edge, etc.

In some exemplary embodiments, the input of the flop may be connected to an output of a different flop (not shown). Additionally or alternatively, the input of the flop may be connected to an input-port of the circuit, for example, Input-Port 243 is connected to the input of Flop 201. Additionally or alternatively, the input of the flop may be connected to the output of a combinatorial-logic block (combo-logic block), for example, Combo-Logic 231 may be connected to the input of Flop 205. It will be noted that other wires may be connected to the input of the Flop. In some exemplary embodiments, the output of the flop may be connected to the input of a different flop (not shown). Additionally or alternatively, the output of the flop may be connected to an output-port of the circuit. As an example, output of Flop 210 is connected to Output-Port 251. Additionally or alternatively, the output of the flop may be connected to a combo-logic. For example, output of Flop 201 is connected to Combo-Logic 231. It will be noted that other wires may be connected to the output of the Flop. A combo-logic block, may have a single output or multiple outputs, where each output represents one logical formula utilizing the inputs to the Combo-Logic block.

In some exemplary embodiments, Circuit 200 may comprise a combo-logic, such as Combo-Logic 231. Combo-Logic 231 may comprise, non memory elements, logic gates, such as for example, AND gate, OR gate, NOT gate, NAND gate, NOR gate, XOR gate; a combination thereof, or the like. The combo-logic may be connected to any input or output of any element of the circuit. In some exemplary embodiments, the combo-logic may not have the capability to retain the value of its elements in a consecutive cycle.

In some exemplary embodiments, Circuit 200 may comprise input-ports such as Input-Port 241. In some exemplary embodiments, input-ports may be used to receive signals from a different circuit, a different portion of the same circuit, an external device, or the like.

In some exemplary embodiments, Circuit 200 may comprise output-ports such as Output-Port 251. In some exemplary embodiments, output-ports may be used to transmit signals to a different circuit, a different portion of the same circuit, an external device, or the like.

In some exemplary embodiments, Circuit 200 may comprise monitoring signals such as Monitoring Signal 261. Monitoring Signal 261 may receive its value from a Comparator 260, which compares 3 pairs of signals, which are designed to have identical values. Flop 202*a* is a duplication of Flop 202. Similarly, Flops 203*a*. 206*a*. 207*a* are duplications of Flops 203, 206, 207, respectively, being fed by the same inputs or inputs of corresponding duplications. For example, Flops 202 and 202*a* are fed by the same input, while Flops 206 and 206*a* are being fed by corresponding inputs, the outputs of two pairs of corresponding duplicative elements, Flops 202 & 202*a*; and Flops 203 & 203*a*. As a result, Flops 202*a*, 203*a*. 206*a*, 207*a* are designed to have the same value in every cycle as in Flops 202, 203, 206, 207, respectively. Hence, if an error occurs, and the values fed into Comparator 260 are not identical, the value of Monitoring Signal 261 detects such discrepancy and can be used to identify the error.

In some exemplary embodiments, Circuit 200 may comprise designated critical nodes such as Output-Port 251.

In some exemplary embodiments, Flops 201, 202, 203, 205, 206 and 207 and Input-Ports 243 and 241 may be in the Logic Of Influence (LOI) of Flop 210. Put differently, the LOT of Flop 210 may comprise all the nodes having direct or indirect path to any of the inputs of Flop 210 (including, but not limited to, data-input, clock-input, set-input, reset-input, enable-input, and the like) and, therefore, may influence Flop 210.

In some exemplary embodiments, Flop 201 and Input-Port 241 may be in an immediate LOI of Flop 205. Put differently, the immediate LOT of Flop 205 may comprise all the nodes having direct path, including through combo logic but not through memory elements, to any of the inputs (including, but not limited to, data-input, clock-input, set-input reset-input, enable-input, and the like) of Flop 205 and, therefore, may influence Flop 205 in the following cycle.

In some exemplary embodiments, Output-Port 251 and Flops 206, 207 and 210 may be in the load of Flop 203. Put differently, the load of Flop 203 may comprise all the nodes having direct or indirect path from one of the outputs of Flop 210 and, therefore, may be influenced by Flop 210.

In some exemplary embodiments, Flop 206, 207 and 210 may be in an immediate load of Flop 203. Put differently, the immediate load of Flop 203 may comprise all the nodes having direct path, including through combo logic, from one of the outputs of Flop 203 and, therefore, may be influenced by Flop 203 in the following cycle.

Figure 3:
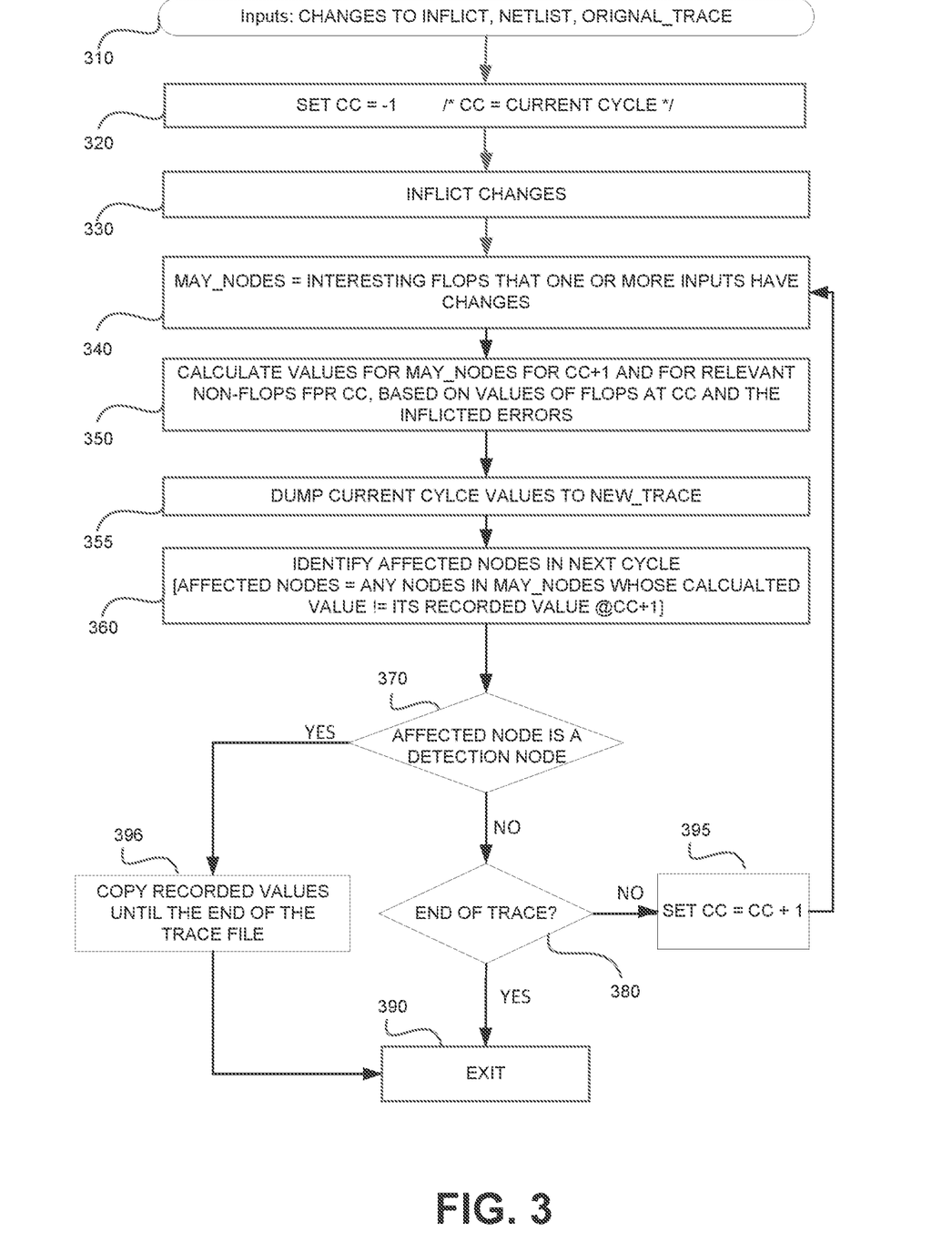
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In Step 310, inputs to the process may be obtained. The input may be a set of changes to be inflicted on the design (e.g., bit flip, netlist modification, or the like). Each inflicted change may be indicated as being inflicted at a specific cycle, at a set of cycles, at every cycle succeeding a specific cycle, or the like.

In Step 310, a representation of the circuit may be obtained. In some exemplary embodiments, the representation may be a netlist representation of the circuit. However, the disclosed subject matter is not limited to such representation.

Further, in Step 310, a trace may be obtained. The trace, also denoted as "original trace" may be a trace of a reference execution. The trace, such as Trace 100 of FIG. 1, may comprise recorded values of the signals in a plurality of cycles. The trace may be represented by at least one trace file. In some exemplary embodiments, a user may determine one or more ROI segments of the trace or traces. It will be noted that reference execution may be an actual execution or a simulated execution. In some cases, when executing, the values may be recorded for only a portion of the signals and the trace may be incomplete and still useable in accordance with the disclosed subject matter. In some cases, a recorded value of a signal that is not an input (is not an external input, input from black-box, input from memory, etc.) may be unavailable (overall or in a specific cycle), such as due to a momentary tracking deficiency, due to loss of data, or the like.

In some exemplary embodiments, such deficiency may be overcome by the disclosed subject matter. In some exemplary embodiments, if the recorded value of a signal that is not an input (i.e., is not an external input, input from black-box, input from memory, etc.) is found to be unavailable (overall or in a specific cycle), the process may overcome this lapse in input by computing missing values using a simulation without any faults, and these computed values later used in the rest of the process as if they existed in the original trace.

In Step 320, the current cycle variable is initialized to −1 to indicate the cycle before the first cycle, which may typically be referred to as cycle 0.

In Step 330, the one or more changes associated with the fault are inflicted on the simulated execution. The one or more changes that are associated with the fault may simulate a hard error occurring at the first cycle of the trace.

In Step 340, a set of interesting nodes which are potentially influenced in the next cycle (CC+1) by the change in this cycle or in previous cycles is determined (denoted as MAY_NODES). In some exemplary embodiments, the set of MAY_NODES may comprise only of flop-nodes. The set of nodes may comprise nodes that include in their immediate LOI nodes that have a changed value with respect to the reference execution. The set of nodes may comprise nodes for which the change affects their computation formula, and specifically the node carrying the fault. In some exemplary embodiments, the set of nodes may ignore nodes that are not detectable, even if they include in their immediate LOI nodes that have changed value with respect to the reference execution.

In Step 350, values of the set of nodes determined in Step 340 may be calculated for the next cycle (CC+1). In some exemplary embodiments, values for relevant non-flop signals may be calculated for the current cycle (CC). The values may be calculated based on the inflicted changes and based on the values of the nodes at the current cycle (CC). It will be noted that in case a node at CC is different than the reference trace, either in view of a change inflicted at CC or a change that was previously inflicted and propagated to CC, the computed value of the node may be used instead of the recorded value thereof.

In some exemplary embodiments, the value of each node that is not potentially affected at cycle CC+1 can be copied from the original trace of the reference execution and computation thereof may be avoided. As most of the nodes may remain unaffected, the reduction in required computation time and memory requirements may be substantial.

In Step 355, the values of the next cycle may be dumped to a trace file (NEW_TRACE) or otherwise retained. The values of the next cycle may be the calculated values of Step 350 and recorded values for all other nodes. In some exemplary embodiments, the disclosed subject matter may only retain a delta file which includes only computed values of nodes for which the value is different than the reference execution or a fixed subset of nodes. In some cases, avoiding to copy unchanged portions of the reference execution may reduce memory requirements substantially and may speed up computations as the I/O bottleneck may be removed.

In Step 360, affected nodes (AFFECTED_NODES) in the next cycle may be identified. In some exemplary embodiments, the affected nodes may be any nodes in MAY_NODES whose calculated value is different than its recorded value at CC+1 in the original trace.

In Step 370, in case one of the AFFECTED_NODES is a detection node, Step 396 may be performed and recorded values of remaining cycles, if any, may be copied prior to the end of the process with the determination that the fault was detected (390). Otherwise, if none of the affected nodes is a detection node, Step 380 may be performed.

In Step 380, in case the trace has ended, the method may end with the determination that the fault was not detected (390). Otherwise, in Step 395, the counter CC is incremented to indicate advancing to next cycle, and Step 340-370 may be so performed again with respect to this new cycle.

Figure 4:
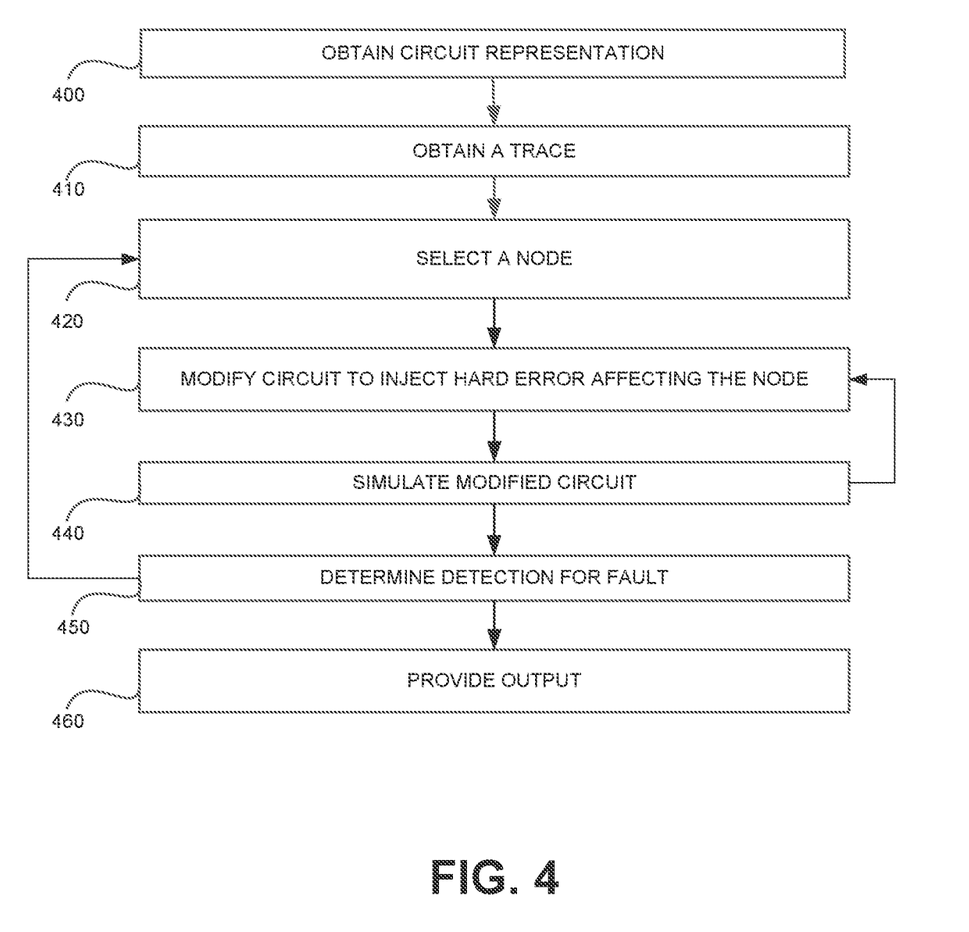
FIG. 4 shows a flowchart diagram of a method, in accordance with some exemplary embodiments of the disclosed subject matter.

Referring now to FIG. 4 showing a flowchart diagram of a method in accordance with some exemplary embodiments of the disclosed subject matter.

In Step 400, a circuit representation may be obtained.

In Step 410, a trace may be obtained.

In Step 420, a node may be selected. The selection may be automatic, such as an iterative selection of all nodes, or manual. In some exemplary embodiments, selected nodes may be verified to be nodes that have in their LOI at least one critical node and have in their LOI at least one monitoring signal. A node which does not have a critical node in its LOI is deemed as safe regardless of the simulated fault.

A node which does not have a monitoring signal in its LOI is deemed as undetectable, in that no test would ever detect it.

In Step 430, a hard error to be inflicted on the design affecting the selected node is determined. A modified design may be computed to allow for simulation of the hard error affecting the design.

In Step 440, one or more simulations of the modified design may be performed. The simulations may or may not be based on values of the trace. In some exemplary embodiments, each simulation is performed until the end of the test, up to a predetermined number of cycles, or until the monitoring signal detects that erroneous functionality.

In some exemplary embodiments, Steps 430-440 may be performed several times for the same node thereby simulating a variety of traces or hard errors affecting the selected node.

In Step 450, the detection result (detected or undetected) is computed for the faults. In some exemplary embodiments, the detection result may be computed for all the faults and all the traces for the node.

In some exemplary embodiments, Steps 420-450 may be performed repeatedly, each time with respect to a different node thereby providing detection results for faults on different nodes.

In Step 460, an output may be provided. In some exemplary embodiments, the output may be an indication of the hard-error test coverage. The output may relate to a single hard-error, a single node, a single fault, a set of nodes such as all nodes in the design or a sub-set of the design, such as all interesting nodes of the design, a combination thereof, or the like. Additionally or alternatively, the output may include the aggregated coverage value, computed as M/N, where M is the number of detected faults and N is the number of total faults analyzed (i.e., both detected and undetected faults and in addition all undetectable faults, too). In some exemplary embodiments, the number N of total faults analyzed also includes faults on in-sensitive nodes (i.e., nodes that pose no safety risks, in that faults on them could never impact a critical node).

In some exemplary embodiments, a user, such as a designer, engineer, or the like, may be informed of an aggregated coverage value of the design. Additionally or alternatively, portions of the design may be analyzed with respect to their coverage differently, such as indicating to the user those portions of the design for which the coverage value is below a predetermined threshold, such as 30%, 50%, 80% or the like. In some exemplary embodiments, the disclosed subject matter may provide recommendations such as introducing additional monitoring signals, reviewing a portion of the design, or the like.

Figure 5:
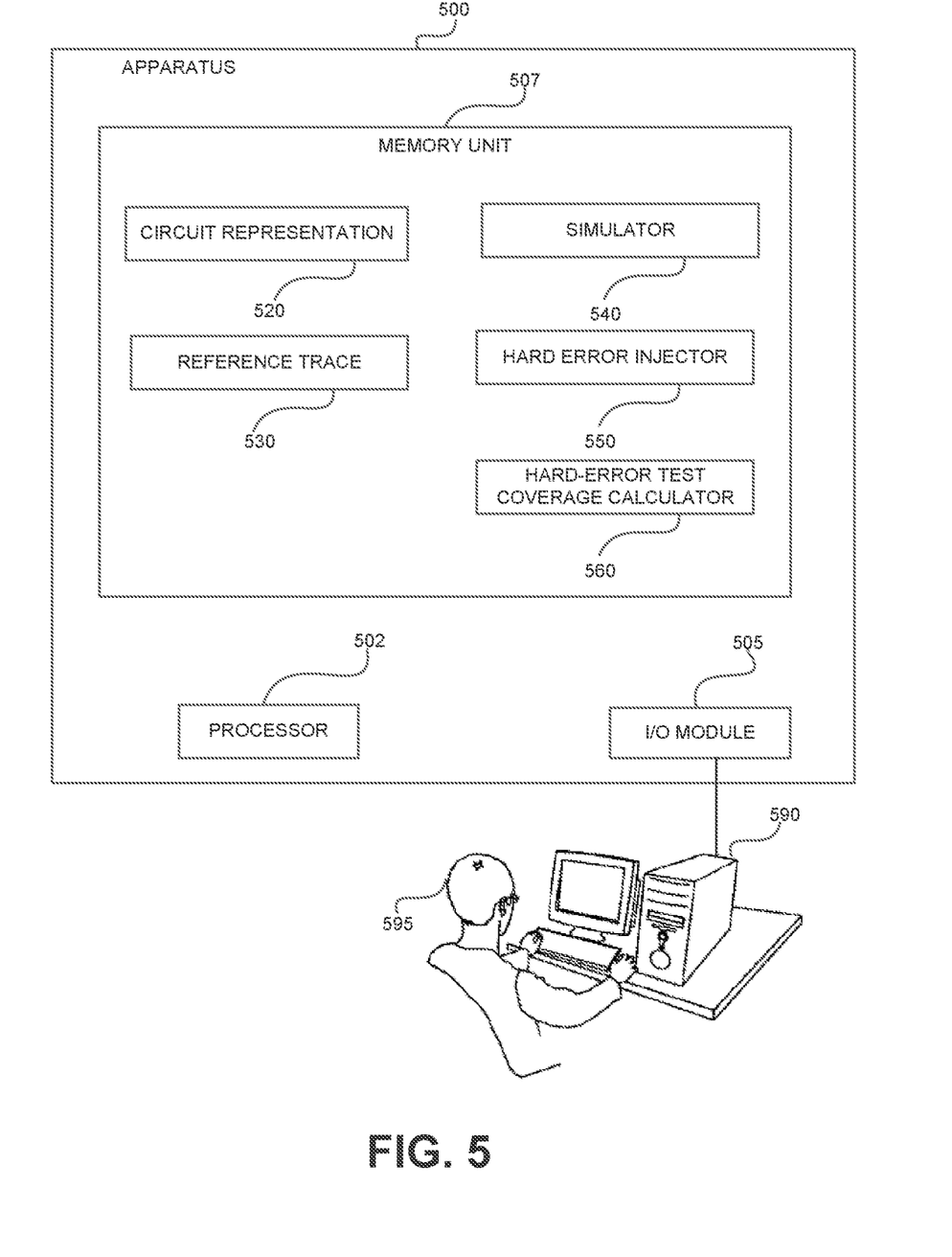
FIG. 5 shows a computerized environment in which the disclosed subject 15 matter is used, in accordance with some exemplary embodiments of the subject matter.

Referring now to FIG. 5 showing an apparatus in accordance with some exemplary embodiments of the disclosed subject matter. An Apparatus 500 may be a computerized apparatus adapted to perform method such as depicted in FIGS. 3 and 4.

In some exemplary embodiments. Apparatus 500 may comprise a Processor 502. Processor 502 may be a Central Processing Unit (CPU), a microprocessor, an electronic circuit, a Field-Programmable Gate Array (FPGA), a Graphical Processing Unit (GPU), an Integrated Circuit (IC), a Virtual Machine or Simulation of one of these, or the like. Processor 502 may be utilized to perform computations required by Apparatus 500 or any of it subcomponents.

In some exemplary embodiments of the disclosed subject matter, Apparatus 500 may comprise an Input/Output (I/O) Module 505. I/O Module 505 may be utilized as an interface to transmit and/or receive information and instructions between Apparatus 500 and external I/O devices, such as a Workstation 590, or the like.

In some exemplary embodiments, I/O Module 505 and Workstation 590 may be used to provide an interface to a User 595 of the system, such as by providing output, visualized results, reports, or the like. In some exemplary embodiments, the output provided to User 595 may be simulated values of the nodes at each cycle. In some exemplary embodiments, Workstation 590 may be used to obtain from User 595 parameters, such as user directives, a typical trace, a circuit, a netlist, simulation thresholds, cycle markers, indications of monitoring signals and critical nodes, a combination thereof, or the like.

In some exemplary embodiments, Apparatus 500 may comprise a Memory Unit 507. Memory Unit 507 may be a hard disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500, such as performing the acts associated with the steps shown in FIG. 3 and FIG. 4.

In some exemplary embodiments, Memory Unit 507 may be used to retain components, such as, a Circuit Representation 520, a Reference Trace 530, or the like. In some exemplary embodiments, Circuit Representation 520 may be, for example, a Netlist file describing a digital circuit design, such as depicted in FIG. 2. Circuit Representation 520 may comprise nodes. In some exemplary embodiments, Reference Trace 530 may comprise the information contained in one or more trace files representing a simulation of a typical operation of the circuit design. Reference Trace 530, such as, Trace 100 of FIG. 1, may be visualized as snapshot of a state machine that reveals the values of relevant nodes at each given cycle of the trace. In some exemplary embodiments, Reference Trace 530 may be a product of the simulation, which may be performed by HDL software simulator, RTL software simulator, Gate-Level simulator, an emulator and a hardware accelerator, or a combination of these, or the like.

Hard Error Injector 550 may be a software product that modifies Circuit Representation 520 to introduce a simulated hard error affecting a node. As an example, Hard Error Injector 550 may modify the netlist formula of the node to a different formula (e.g., constant value, random value, X value, combinatorial formula, or the like).

Simulator 540 may be a software product for performing simulation in 3o accordance with the disclosed subject matter. Simulator 540 may simulate execution of the modified Circuit Representation 520 using Reference Trace 530. Reference Trace 530 may be used by Simulator 540 to avoid redundant computations that the outcome of which can be retrieved from Reference Trace 530 instead of re-computing.

The Hard-Error Test Coverage Calculator 560 may be configured to compute the test coverage for a node based on the simulations of hard errors affecting the node during the test run. In some exemplary embodiments, it may also provide detection results for faults on multiple nodes or all the signals or all interesting signals in the design or a sub-set of the design.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, any other storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, any other storage device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a wireless network and/or any other network. The network may comprise metal (e.g., copper) transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, machine independent instructions, microcode, firmware instructions, state-setting data, or either source code or object code written in any combination of one or more programming languages, including object oriented programming languages such as Smalltalk. C++ or the like, and conventional procedural programming languages, such as the "C" programming language or similar programming languages, as well as scripting languages such as Python or TCI, or any other type of programming language. The computer readable program instructions may execute entirely on the user's computer, partly on the user's computer, as a stand-alone software package, partly on the user's computer and partly on a remote computer or entirely on the remote computer or server, or on a combination of machines some of whom may be owned by the user and some may not be. In the latter scenario, the remote computer or machines may be connected to the user's computer or machines through any type of network, including a local area network (LAN) or a wide area network (WAN), or the connection may be made to one or more external machines (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computers, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto one or more computers, other programmable data processing apparatus, or other devices to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in so the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    obtaining a design of a circuit, wherein the circuit comprises nodes which are assigned values during execution, wherein the circuit comprises one or more monitoring signals for identifying errors and one or more critical nodes;
    obtaining a recording of a reference execution of the circuit, wherein the recording comprises recorded values of the nodes in a plurality of cycles;
    obtaining a hard error fault on a node, wherein the hard error fault is potentially capable of causing a wrong value to reach the one or more critical nodes;
    identifying one or more interesting nodes, wherein a Logic of Influence (LOI) of each of the one or more interesting nodes comprises at least one monitoring signal and at least one critical node;
    determining, by a processor, a hard-error test coverage for the hard error fault, wherein the hard-error test coverage is indicative of whether or not the one or more monitoring signals identifies the hard error fault during an execution of the test, and wherein said determining comprises: simulating the execution of the circuit together with the hard error fault and noting whether or not any one or more of the one or more monitoring signals has detected the hard error fault, wherein said simulating comprises, during simulation of each cycle;
    determining a sub-set of the interesting nodes the value of which is potentially different than the recorded value in a corresponding cycle in the reference execution;
    for each node not in the sub-set of nodes, using the recorded value as the value of the node; and
    for each node in the sub-set of nodes, computing the value of the node; and
    outputting an indication of the hard-error test coverage.

2. The computer-implemented method of claim 1, wherein said determining is performed with respect to a plurality of nodes comprised in the circuit, whereby test coverage is determined for each node of the plurality of nodes, wherein said outputting comprises outputting a list of the plurality of the nodes and associated coverage values of the hard error fault on the plurality of nodes.

3. The computer-implemented method of claim 2, wherein said outputting comprises outputting an aggregate coverage value, wherein the aggregate coverage value is a ratio of executions in which the hard error faults were detected out of all possible executions.

4. The computer-implemented method of claim 1, wherein said simulating execution comprises: determining a modified design simulating the hard error fault, wherein the modified design is configured to set a value of the node to a constant value in each cycle.

5. The computer-implemented method of claim 1, wherein said simulating execution comprises: determining a modified design simulating the hard error fault, wherein the modified design is configured to set a value of the node to a random value in each cycle that is not influenced by input signals to the node.

6. The computer-implemented method of claim 1, wherein said simulating execution comprises: determining a modified design simulating the hard error fault, wherein the modified design is configured to set a value of the node to an X value in each cycle, representing an unknown value.

7. The computer-implemented method of claim 1, wherein at least one of the one or more monitoring signals is part of a Built-In Self Test (BIST) or part of a lock-step or Triple Modular Redundancy (TMR) construct.

8. The computer-implemented method of claim 1, wherein said determining comprises: for each interesting node, determining whether values of an influencing set of nodes of the interesting node are the same in the simulation as in the reference execution, wherein the influence set of nodes is a set of nodes in the design that define the value of the node.

9. The computer-implemented method of claim 8, wherein the influencing set of nodes of the interesting node in a first cycle is different than the influencing set of nodes of the interesting node in a second cycle, whereby a determination of whether to compute a value of the interesting node is made based on a different set of nodes in different cycles.

10. A computer-implemented method comprising:
    obtaining a design of a circuit, wherein the circuit comprises nodes which are assigned values during execution, wherein the circuit comprises one or more monitoring signals for identifying errors and one or more critical nodes,
    obtaining a trace of a run of a test of the circuit;
    obtaining a hard error fault on a node, wherein the hard error fault is potentially capable of causing a wrong value to reach the one or more critical nodes;
    determining, by a processor, a hard-error test coverage for the hard error fault, wherein the hard-error test coverage is indicative of whether or not the one or more monitoring signals identifies the hard error fault during an execution of the test, and wherein said determining comprises simulating the execution of the circuit together with the hard error fault and noting whether or not any one or more of the one or more monitoring signals has detected the hard error fault; wherein said simulating execution comprises: determining a modified design simulating the hard error fault, wherein the design comprises a modeling of a first function defining a value of the signal in each cycle, wherein the modified design comprises a modeling of a second function defining a value of the signal in each cycle, wherein the second function is different than the first function; and
    outputting an indication of the hard-error test coverage.

11. A computer-implemented method comprising:
    obtaining a design of a circuit, wherein the circuit comprises nodes which are assigned values during execution, wherein the circuit comprises one or more monitoring signals for identifying errors and one or more critical nodes;

obtaining a trace of a run of a test of the circuit;

obtaining a hard error fault on a node, wherein the hard error fault is potentially capable of causing a wrong value to reach the one or more critical nodes;

determining, by a processor, a hard-error test coverage for the hard error fault, wherein the hard-error test coverage is indicative of whether or not the one or more monitoring signal identifies the hard error fault during an execution of the test, and wherein said determining comprises simulating the execution of the circuit together with the hard error fault and noting whether or not any one or more of the one or more monitoring signals has detected the hard error fault, wherein said simulating comprises, during simulation of each cycle, avoiding computation of values in one or more undetectable nodes, wherein a Logic of Influence (LOI) of each of the one or more undetectable nodes does not comprise any of the one or more monitoring signals; and outputting an indication of the hard-error test coverage.

12. A computer-implemented method comprising:

obtaining a design of a circuit, wherein the circuit comprises nodes which are assigned values during execution, wherein the circuit comprises one or more monitoring signals for identifying errors and one or more critical nodes;

obtaining a recording of a reference execution of the circuit, wherein the recording comprises recorded values of the nodes in a plurality of cycles;

determining that the reference execution is missing the recorded values of one or more non-input signals in one or more cycles;

in response to said determining that the reference execution is missing the recorded values, reconstructing the missing values using a simulation without any faults;

obtaining a hard error fault on a node, wherein the hard error fault is potentially capable of causing a wrong value to reach the one or more critical nodes;

determining, by a processor, a hard-error test coverage for the hard error fault, wherein the hard-error test coverage is indicative of whether or not the one or more monitoring signal identifies the hard error fault during an execution of the test, and wherein said determining comprises simulating the execution of the circuit together with the hard error fault and noting whether or not any one or more of the one or more monitoring signals has detected the hard error fault, wherein said simulating the execution of the circuit is performed using the recorded values of the reference execution, and outputting an indication of the hard-error test coverage.

13. A computer-implemented method comprising:

obtaining a design of a circuit, wherein the circuit comprises nodes which are assigned values during execution, wherein the circuit comprises one or more monitoring signals for identifying errors and one or more critical nodes;

obtaining a trace of a run of a test of the circuit;

obtaining a hard error fault on a node, wherein the hard error fault is potentially capable of causing a wrong value to reach the one or more critical nodes;

determining, by a processor, a hard-error test coverage for the hard error fault, wherein the hard-error test coverage is indicative of whether or not the one or more monitoring signal identifies the hard error fault during an execution of the test, and wherein said determining comprises simulating the execution of the circuit together with the hard error fault and noting whether or not any one or more of the one or more monitoring signals has detected the hard error fault;

outputting an indication of the hard-error test coverage;

verifying the node with the hard error fault is an interesting node, wherein said verifying comprises determining a Logic of Influence (LOI) of the node, and verifying that the LOI comprises at least one monitoring signal and at least one critical node;

marking all nodes without any critical node in their respective LOI as safe nodes; and marking all nodes having at least one critical node in their respective LOI and not having any monitoring signals in their respective LOI as undetectable for all tests.

14. A computer program product comprising a computer readable storage medium retaining program instructions, which program instructions when read by a processor, cause the processor to perform:

obtaining a design of a circuit, wherein the circuit comprises nodes which are assigned values during execution, wherein the circuit comprises one or more monitoring signals for identifying errors and one or more critical nodes;

obtaining a recording of a reference execution of the circuit, wherein the recording comprises recorded values of the nodes in a plurality of cycles;

obtaining a hard error fault on a node, wherein the hard error fault is potentially capable of causing a wrong value to reach the one or more critical nodes;

identifying one or more interesting nodes, wherein the Logic of Influence (LOI) of each of the one or more interesting nodes comprises at least one monitoring signal and at least one critical node;

determining, by a processor, a hard-error test coverage for the hard error fault, wherein the hard-error test coverage is indicative of whether or not the one or more monitoring signals identifies the hard error fault during an execution of the test, and wherein said determining comprises: simulating the execution of the circuit together with the hard error fault and noting whether or not any one or more of the one or more monitoring signals has detected the hard error fault, wherein said simulating comprises, during simulation of each cycle, determining a sub-set of the interesting nodes the value of which is potentially different than the recorded value in a corresponding cycle in the reference execution;

for each node not in the sub-set of nodes, using the recorded value as the value of the node; and for each node in the sub-set of nodes, computing the value of the node; and outputting an indication of the hard-error test coverage.

15. The computer program product of claim 14, wherein said determining is performed with respect to a plurality of nodes comprised in the circuit, whereby test coverage is determined for each node of the plurality of nodes, wherein said outputting comprises outputting a list of the plurality of the nodes and associated coverage values of the hard error fault on the plurality of nodes.

16. The computer program product of claim 15, wherein said outputting comprises outputting an aggregate coverage value, wherein the aggregate coverage value is a ratio of executions in which the hard error faults were detected out of all possible executions.

17. The computer program product of claim 14, wherein said determining comprises: for each interesting node, determining whether values of an influencing set of nodes of the interesting node are the same in the simulation as in the reference execution, wherein the influence set of nodes is a set of nodes in the design that define the value of the node.

18. A computer program product comprising a computer readable storage medium retaining program instructions, which program instructions when read by a processor, cause the processor to perform:
obtaining a design of a circuit, wherein the circuit comprises nodes which are assigned values during execution, wherein the circuit comprises one or more monitoring signals for identifying errors and one or more critical nodes;
obtaining a hard error fault on a node, wherein the hard error fault is potentially capable of causing a wrong value to reach the one or more critical nodes;
determining, by a processor, a hard-error test coverage for the hard error fault, wherein the hard-error test coverage is indicative of whether or not the one or more monitoring signal identifies the hard error fault during an execution of the test, and wherein said determining comprises simulating the execution of the circuit together with the hard error fault and noting whether or not any one or more of the one or more monitoring signals has detected the hard error fault, wherein said simulating comprises, during simulation of each cycle, avoiding computation of values in one or more undetectable nodes, wherein a Logic of Influence (LOI) of each of the one or more undetectable nodes does not comprise any of the one or more monitoring signals; and
outputting an indication of the hard-error test coverage.

* * * * *